May 23, 1939.  H. E. ANDERSON  2,159,582
BRAKE BEAM SAFETY SUPPORT
Filed June 20, 1936  2 Sheets-Sheet 1

INVENTOR.
Harley E. Anderson
BY
ATTORNEY.

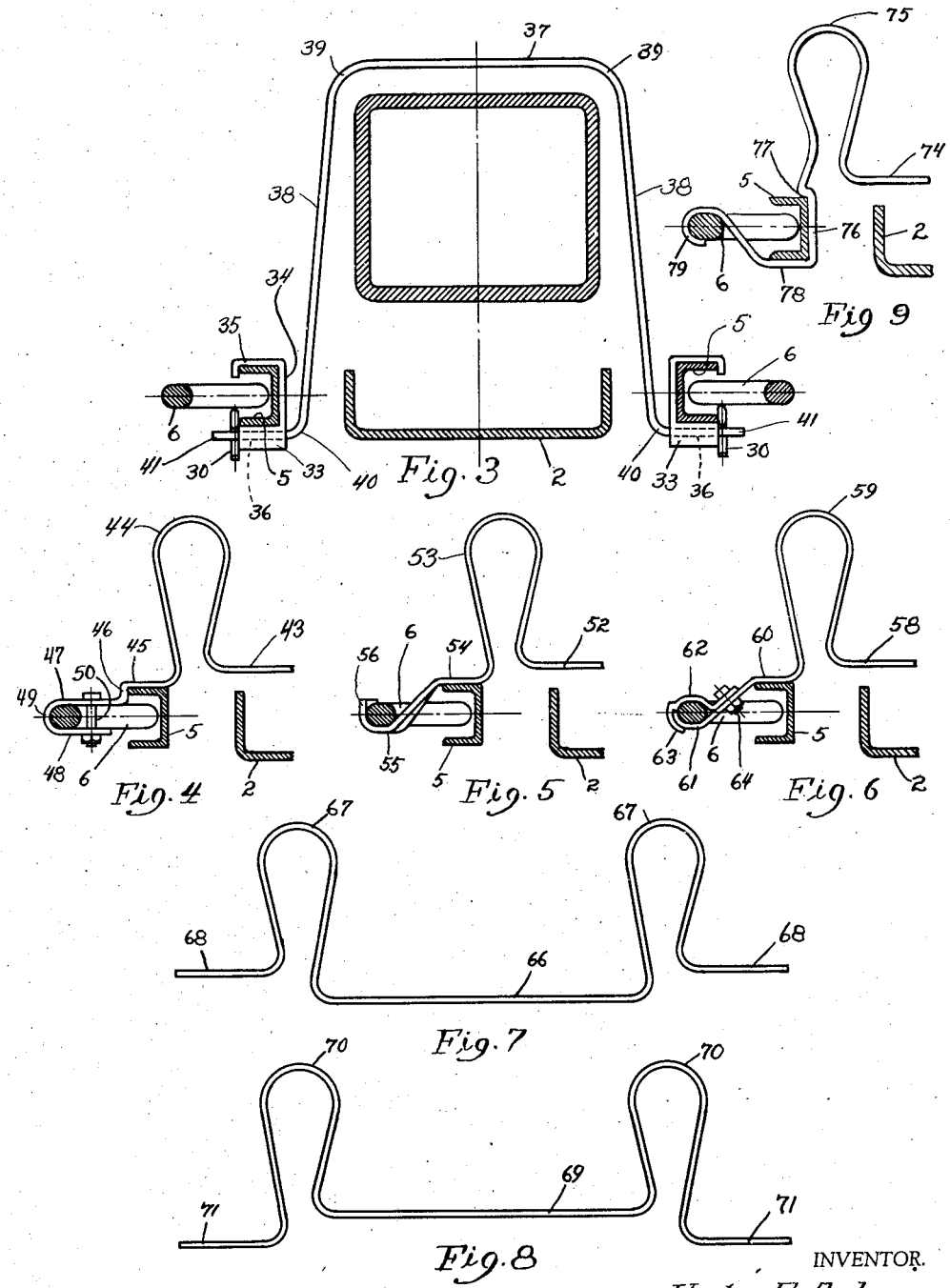

Patented May 23, 1939

2,159,582

UNITED STATES PATENT OFFICE 2,159,582

BRAKE BEAM SAFETY SUPPORT

Harley E. Anderson, Chicago, Ill., assignor to John H. Sharp, Chicago, Ill.

Application June 20, 1936, Serial No. 86,260

12 Claims. (Cl. 188—210)

My invention relates generally to improvements in the brake rigging on railway car trucks, and more particularly to a simple, efficient and inexpensive device for positioning the brake beams to cause a quick and sure release of the brake shoes and maintain a clearance between the brake shoes and the wheels after the brakes have been released, as well as to serve as a guard device and emergency support for carrying the brake beams and brake rigging from the spring plank in the event of failure of the brake hangers.

The brake beams as generally applied on four wheel trucks, for instance, lie between the wheels and are suspended from the truck side frames by swinging hangers, the brake beams being connected by the usual brake levers which are connected by a connecting rod so that both brakes beams will move in unison. In such brake mechanisms the brake shoes are released from the wheels entirely by gravity since the brake hangers are in an inclined position when the brakes are applied and only release when the car is in motion. If the brakes are released while the car is standing, the brake shoes on all four of the wheels will almost invariably remain in contact and not swing away from the wheels until the car is set in motion because of the friction in the brake rigging. Obviously, on a long train of cars this requires a greater initial draw bar pull by the locomotive than it would if all the brake shoes were automatically released from the wheels while the train was standing.

My invention has among its objects the provision of a device of the kind described which consists of a minimum of parts, is inexpensive to manufacture, which may be easily applied or removed, is simple in construction, of long life and durable and not subject to wear and tear and which is effective and efficient at all times.

Another object is the provision of an emergency support or guard constituting an auxiliary hanger for brake beams that will be effective at all times when required.

Another object of the invention is to provide spring means operative to cause the quick release of the brake shoes from the wheels when the car is standing and for maintaining a clearance between the brake shoe and wheels after the brakes have been released as well as maintaining the brake beams in a horizontal position and the brake heads and brake shoes in a vertical position.

A further object is to provide efficient means for attaching a simple cooperating device to the brake beams without requiring the use of bolts or rivets as a necessity, although of course supplemental means may be employed if desired.

Another object is to provide a guard so arranged and positioned below the bolster and spaced above the standard spring plank which will drop down and rest on the spring plank in the event of failure of brake hangers so as to support the brake rigging from the spring plank and prevent the same from dropping down on the tracks. Another object is the production of a device which is not attached to the spring plank and is normally out of engagement therewith except in the case of an emergency and which may be constructed in varied sizes so as to be suitable for spring planks of various sizes and spaced a predetermined distance above the spring plank whereby the amount of drop of the brake rigging is not excessive.

The invention has among its further objects the production of a device which will resiliently hold the brake beams and brake connections at all times so as to reduce wear on the parts normally caused by the swinging motion and vibration of the parts when the car is in motion.

Another object of the invention is the production of a simple device of the kind described employing but few parts in which there is no relative movement between the parts when the device is installed and is functioning in its intended manner so that there is no wear due to one part rubbing against another. The possibility of binding or sticking of parts due to wear and preventing the brakes from operating is, therefore, entirely obviated, neither can the parts get out of adjustment so that the device may be considered as fool-proof.

Another object is the production of a device of the kind described which may be readily and easily installed or removed, and which permits the ready removal and replacement of brake beams, shoe or brake rigging parts.

Many other objects and advantages of this improvement in construction herein shown and described will be obvious to those skilled in the art.

To this end my invention consists in the novel construction, arrangement and combination of parts herein shown and described, and more particularly pointed out in the claims.

In the drawings, wherein like reference characters indicate like or corresponding parts:

Fig. 3 is a sectional view similar to Fig. 2 showing a modified construction with the bar above the spring plank and bolster;

Figs. 4, 5 and 6 are sectional views of portions of devices illustrating modified constructions;

Fig. 7 is a view in elevation of a bar for use where the spring plank is low or has low flanges;

Fig. 8 is a similar view illustrating a bar adapted for use where the spring plank or its flanges are high;

Fig. 9 is a sectional view illustrating another variation in the construction of the bar.

Figure 1:
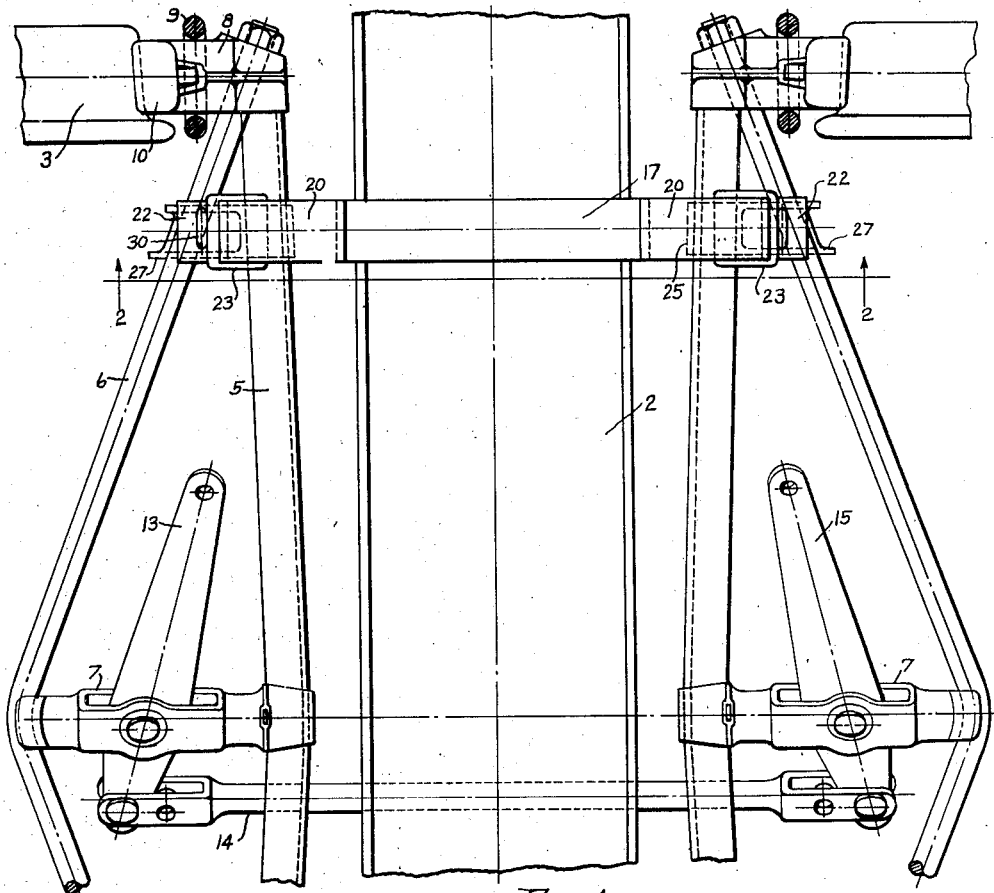
Fig. 1 is a top plan view showing a portion of a railway car construction and one of the devices as applied thereto.

Referring to the drawings, only a portion of a standard four-wheel freight car truck is illustrated to show the application of my improved device thereto. The truck shown consists of a truck bolster 1, a spring plank 2 and wheels 3 and other parts not necessary to show or describe herein. Only a portion of the brake rigging is shown. The compression members of the brake beams are designated as 5 and the tension members as 6. The brake rigging is provided with the usual brake beam struts 7, the brake beam heads 8, the brake beam hangers 9, the brake shoes 10 which are attached to the brake heads 8 by means of brake shoe keys 11, the dead lever 13, bottom rod 14, live lever 15, all of which are standard parts of the standard freight car construction.

In Fig. 1, the bolster is omitted. My device is applied to the truck and yieldingly connects the two brake beams consisting of the compression and tension members 5 and 6, the same extending between the bolster and spring plank and spaced from each. Each truck is provided with two of the devices arranged one at each side of the truck, the two being substantially identical except that the attaching members are preferably made in rights and lefts so that a description of one device will be sufficient for both.

As illustrated, 17 represents a bar, preferably of flat stock of suitable size for the purpose, which is formed with one or more loops by bending the bar, as indicated at 19, 20 and 21, with the ends extending as at 22 in the same direction as the intermediate portion 17, although not necessarily in the same plane as will be hereinafter illustrated.

Figures 2, 10:
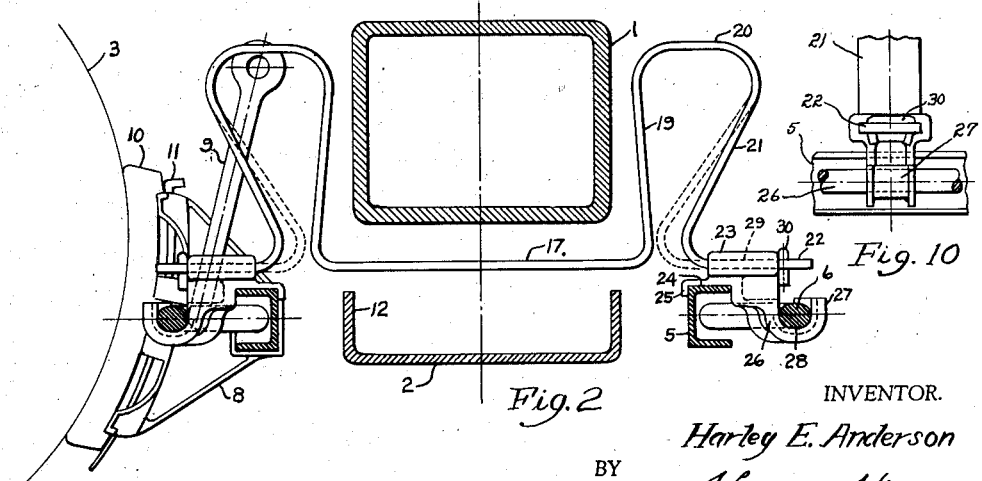
Fig. 2 is a sectional view taken substantially on the line 2—2 of Fig. 1.
Fig. 10 is a fragmentary elevational view of a portion of the structure shown in Fig. 2.

The bar is so constructed and tensioned that the loops normally tend to close as indicated by the dotted lines in Fig. 2 and contract or draw the ends 22 together. The bar may thus be distended or expanded lengthwise under strain but will normally contract when the strain is released and resume its normal length. The ends of the bar may be attached to the brake beam in any suitable manner but preferably so that it may be readily attached or detached and so that it will not interfere with the renewal of the brake beams or other parts of the brake rigging.

For the purpose I have shown what may be termed attaching members 23, these being made in lefts and rights, as previously mentioned. They are each constructed with a seat 24 to rest upon the top face of the compression member 5, one end being preferably formed as at 25 to overlie the face of the beam while the other end or side extends downwardly, thence laterally and upwardly, as indicated at 26 and 27, the seat 28 extending angularly so that the hook may engage the tension rod 6. Obviously, when the attaching member is seated on the compression member 5 with the depending portion hooked onto the tension member 6, the attaching member cannot move lengthwise of the compression member 5. When the connecting bar is in place, the attaching members are locked on the beams and cannot be removed except by disconnecting the bar therefrom. This obviates the necessity of bolts, rivets or other securing means, but, if desired, the attaching members may be secured to the beams in any other satisfactory manner, either by bolts, rivets or other parts.

Each attaching member is provided with an aperture 29 of a size to receive and closely fit the end 22 of the bar which is provided with a hole through which the usual standard cotter pin 30 may be passed. Of course, a bolt or other style of pin may be employed but, in view of the fact that cotter pins are standard and used in connecting other parts of the brake rigging, the cotter pin is, therefore, preferred.

In applying the device, the attaching members 23 are placed on the beam in their proper places and the looped bar positioned between the bolster and spring plank with the ends at the attaching members. First, one brake beam is moved inwardly toward the spring plank or the end of the bar 22 pushed through the aperture in the member 23 and the cotter pin applied. Then the other brake beam is raised up and slipped back on the end of the bar and the other cotter pin applied. Both ends of the bar are thus securely attached to the two brake beams, the tension of the bar through the loops tending to draw the brake beams together toward the spring plank and draw the brake shoes from the wheels (in Fig. 2 the rod is shown distended since the brake shoes are in braking contact with the wheel).

It will be noted that the loops are formed so as to avoid any sharp bend at the flexing portion, the flexing being substantially at the upper end 20, although, of course, there will be some at the lower ends.

The pressure or pull of the device, of course, depends upon the material used, that is, the size of the same as well as the size of the loops. Ordinarily, the spring is designed to give a pull of about 100 pounds or more through each loop or a total of around 200 pounds or more on each brake beam, this amount of compression or tension being required to hold the brake beam and associated parts in a horizontal position when the device pulls the beams away from the wheels. When the brakes are set, of course, the tension of each spring is more, say, for example, 150 pounds or 300 pounds on each beam, this increasing as the shoes are worn. These tensions may vary, however, so that the pounds mentioned are merely for illustration.

In case it is necessary to replace a broken brake beam with a new one, the cotter pin is removed and the bar slipped out of the attaching member, after which the attaching member may be removed from the beam and placed on the new beam and the device connected up again as previously described. When the brakes are applied, the bar is distended but when the brakes are released the bar contracts, moving both brake beams toward the center of the truck and carrying the brake shoes with the brake beam. The device not only pulls the brake beams toward the center of the truck but maintains the beams in horizontal position and the brake shoes in vertical positions, thereby preventing the brake beam and its attachments from tilting forward and permitting the top of the brake shoes to rub the wheels.

In use normally, the two brake beams are hung on inclined hangers, swingingly suspended from the truck side frames. This is for the reason that after the car is jerked or in motion the weight of the two brake beams, together with the weight of the two truck levers and bottom rod, cause the brake beams to swing away from the tread of the wheels until the brake beam hangers are in a perpendicular position. This actually happens after the car is in motion a while and the piston of the brake cylinder has returned to its complete release position and the tension on all brake rods has been removed, thereby allowing the top of the truck live lever to move towards the truck bolster or center of the truck; releasing the load or pressure on the brake beams, they are free to swing towards each other, which is caused by the dead weight of the beams hanging on the brake hangers, whose top centers are much less apart than the bottom centers of the hangers when the brake beams are up against the wheels.

My spring tension support bar being in tension when the beams are up against the wheels, tends to pull the beams toward each other and hastens the brake beams to assume their natural release position, which is when the hangers are in a true perpendicular position, supporting the dead weight of the two brake beams. If my bar was attached at its center to either the bolster or spring plank, only the brake beam carrying the truck live lever, which top end is free to move, would be pulled away from the wheel and since the bar would be in a fixed position if it was attached at its center to the bolster or spring plank, it would prevent the two brake beams to center themselves between the opposite wheels by the dead weight of the beams. The tension bar, when the brake rod is disconnected from the truck live lever, like when the truck is to be rolled out from under the car, snaps the two brake beams completely inwardly or up against the side flanges of the spring plank, if there is a spring plank, as far as they will move away from each wheel.

While the bars are not in any way attached to the spring plank, in case of brake beam hanger failure or where the pin or keeper bolt is lost, the brake beam and bar will drop down until the flat bar rests upon the flange of the spring plank. The fact that the bar is formed into a loop between where it rests on top of the spring plank and the attaching casting which is secured to the brake beam, the safety bar is thereby much stronger than if the bar was straight since the bar has considerable bearing on the spring plank and in falling the brake beams are cushioned on the spring plank due to the loops in the bar. A solid rod would perhaps be bent when the beam dropped, but in this instance the bar loops act as shock absorbers and there is no shock.

In the construction shown in Fig. 3 the positioning device consists of the bar 37 bent down at 39 to provide the legs 38, the ends being bent laterally as shown at 40, with the extreme ends 41 extending to and attached to the brake rigging compression member 5. As shown, my attaching member 33 is mounted on the compression member and consists of the extending parts 34 and 35 engaging with the face and top of the member. The same is provided with an opening 36 through which the end 41 of the bar is projected, the bar being secured to the attaching member by means of a cotter pin 38 or equivalent means. In this construction the ends of the supporting or positioning bar extend below the compression member rather than overlying the same, the result being the same.

In Fig. 4 only one end of the bar is shown, the opposite end being similar, as will be readily understood. The bar 43 is looped as at 44 and thence bent laterally to overlie the compression member 5 and then bent downwardly as at 46 and extended outwardly at 47, thence bent down and inwardly as at 48 so as to engage the tension member 6 in the loop thus formed. For additional security, a bolt 50, a cotter pin or the equivalent, though not necessary, may be employed should the same be desired.

In the device illustrated in Fig. 5 the ends of bar 52 are looped as at 53 with the ends extended as at 54, 55 and 56 so as to engage with the tension members 6. The construction shown in Fig. 6 is somewhat similar, 58 representing the bar looped as at 59 and thence extended as at 60 and 61. In this case an additional clamping member 62 is arranged at each end, with the end 63 overlapping the end 61 of the bar. A bolt 64 or equivalent means secures the member 62 in place so that the device is securely clamped to the tension rod 6.

A few important advantages in this construction are that some cars have a very small flange on the spring plank as, for example, 1½" instead of a 4" flange, while some cars have spring planks that are merely a flat plate with no flange at all. However, in practically all car constructions, the height of the brake beams remains about 13" from the center of the shoe to the top of the rail, so that with a typical bottom rod there might be a drop of 4" or 5" of the positioning device in the case of a small flange spring plank before the device rested upon the same, thereby permitting the lower end of the brake shoe to drag on the rail. With the type of bar herein illustrated, the body of the bar or the horizontal bar between the truck bolster and spring plank intermediate the loops may as described be so constructed that the bar is normally only an inch, for example, above the extremely low type of spring plank. In other words, the ends and intermediate part of the bar need not be in the same plane or straight line. Likewise, in the case of an extremely high flange on a spring plank with the top of the compression member of the brake beam below the top of the flange, the ends of a rigid straight bar may be so positioned relative the intermediate portion over the spring plank that it is necessary to burn out a notch in the flange of the spring plank in order to provide the clearance. With this device the ends are extended in a lower plane. Likewise, it is not desirable to use a high attaching member on the brake beam and attach the bar at a point high above the central line of the brake beam, as this will not afford a direct straight line draw on the beam as is secured with the design herein disclosed.

In Fig. 7 the bar 66 is shown with loops 67 and extending ends 68, it being noted that the intermediate portion 66 is below the plane of the ends 68, this type of bar being suitable for use with a low spring plank or with a spring plank having low side flanges as previously mentioned. Fig. 8 shows a device with the intermediate portion 69 connected by the loops 70 to the end portions 71, and in this case the intermediate portion or body of the bar is in a plane above the ends 71 so that the device is suitable for use on a truck where the spring plank is high or is provided with high flanges at the edges.

The construction shown in Fig. 9 is somewhat similar to that shown in Fig. 5, the bar, however, underlies the compression member. The bar 74 is provided with a loop at each end as indicated at 75, and extends down the face of the member 5, at 76, thence under as at 78 with the extreme end hooked over the tension member 6. The leg of the loop is preferably provided with a shoulder 77, which will retain the member 5 and bar seated.

In the present construction the bar may be made to maintain the brake beam in proper position at all times.

Another important advantage in the present construction is that there is no relative movement of the bar and the attaching members, or between the attaching members and beams, that is to say, they do not have a sliding engagement which is bound to cause wear on the bar or wear on the castings. There can be no binding or cocking that would prevent the brake shoes from being applied against the wheels.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim is new and desire to secure by Letters Patent is:

1. An auxiliary support for brake beams consisting of a one-piece bar of resilient material provided with a loop adjacent each end, and means for connecting the ends of said bar to respective brake beams, said bar carried normally solely by the brake beams and freely shiftable longitudinally therewith.

2. A positioning bar for brake beams consisting of a one-piece bar of resilient material provided with one or more transversely extending loops intermediate its ends whereby the bar, normally contracted, may expand lengthwise to vary the distance between the ends, said bar having means for attaching the same at each end to a respective brake beam, the intermediate portion of the bar being normally supported from the ends and longitudinally shiftable with said beams as required.

3. A brake beam positioning device of the kind described consisting of a one-piece bar provided with a transversely extending resilient loop adjacent each end whereby the bar may be expanded in a lengthwise direction, and means for detachably securing the ends of said bar beyond the loops to respective brake beams of adjacent wheels, the intermediate portion of the bar between the ends being normally free and unsupported.

4. A brake beam positioning device of the kind described consisting of a one-piece bar provided with a transversely extending resilient loop adjacent each end whereby the bar may expand or contract in a lengthwise direction, and means for securing the free ends of said bar beyond the loops to respective brake beams of adjacent wheels, the intermediate portion of the bar between the ends being normally free and unsupported.

5. A brake beam support bar of the kind described consisting of a flat bar of a length to extend between and overlie the brake beams, said bar provided with transversely extending loops located one adjacent to each end of the bar, but spaced back from the end, and attaching means at each end of the bar for rigidly securing the ends to the brake beams, the intermediate portion of the bar between the ends being normally free and unsupported.

6. In a railway truck of the kind described and in combination, a bolster, a spring plank disposed therebelow, a pair of brake beams swingingly mounted one on each side of said bolster and spring plank and a brake beam positioning member spaced from and extending below the bolster and over and free from the spring plank and yieldingly connecting said brake beams, said positioning member comprising a bar having an upwardly extending resilient loop, normally contracted, adjacent each end at each side of the spring plank and provided with means for attaching the ends to the brake beam.

7. In a brake rigging of the kind described and in combination, a spring plank, a pair of brake beams swingingly mounted one on each side of said spring plank and a brake beam positioning member spaced from and extending over the spring plank and connecting said break beams, said positioning member comprising a bar having an upwardly extending tensioned resilient loop adjacent each end at each side of the spring plank, the said loops being so constructed that the intermediate portion of the bar is normally spaced a predetermined distance above the spring plank, and provided with means for attaching the ends to the brake beams.

8. In a brake rigging of the kind described, a pair of spaced brake beams, a spring plank, said brake beams swingingly mounted one on each side of said spring plank, and a brake beam positioning member yieldingly connecting the brake beams and located above and free from the spring plank, said positioning member consisting of a distensible bar provided with one or more resilient loops intermediate its ends at each side of the spring plank constructed to normally contract the bar, and having means at its ends for attaching the same to a brake beam.

9. In a brake rigging of the kind described and in combination, a spring plank, a pair of brake beams swingingly mounted one on each side of said spring plank and a brake beam positioning device spaced from and extending over the spring plank and connecting said brake beams, said positioning device consisting of a bar having an upwardly extending resilient loop at each end constructed to normally contract the bar lengthwise to draw the brake beams toward the spring plank, said loops being disposed at each side of the spring plank between the plank and the beams, and an attaching member for rigidly securing each end of the bar to the brake beams of adjacent wheels.

10. In a brake rigging of the kind described and in combination, a spring plank, a pair of brake beams having compression and tension members swingingly mounted one on each side of said spring plank and a brake beam positioning device and emergency support spaced from and extending over the spring plank and connecting said brake beams, said positioning device consisting of a bar having a plurality of transversely extending resilient loops constructed to normally contract the bar lengthwise to draw the brake beams toward the spring plank or distend to permit the beams to separate, and attaching members for securing each end of the bar to the compression and tension members of the brake beams.

11. A positioning device for brake beams consisting of a flat elongated bar having means at its ends for attaching the same to beams of adjacent wheels free of other attaching means, said bar having upwardly extended loops and constructed to distend lengthwise when the beams are moved to operative brake applying position and to contract and draw the beams together when the brakes are released.

12. A positioning device for brake beams consisting of a one-piece resilient bar having means at its ends for rigidly attaching the same to the beams of adjacent wheels, said beams constituting the sole support of said bar during normal operation, said bar constructed to distend lengthwise when the beams are moved to operative brake applying position and to contract and draw the beams together when the brakes are released.

HARLEY E. ANDERSON.